United States Patent
Brinkmann et al.

(10) Patent No.: US 6,327,080 B1
(45) Date of Patent: Dec. 4, 2001

(54) MICROSCOPE COMPRISING AN EXCHANGEABLE INTERMEDIATE TUBE

(75) Inventors: Hans Brinkmann, Goettingen; Peter Dietrich, Oberkochen; Hans-Juergen Dobschal, Kleinromstedt; Heinz Ozimek, Kattenburg-Lindau; Georg Herbst, Goettingen, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/486,404

(22) PCT Filed: May 26, 1999

(86) PCT No.: PCT/EP99/03647

§ 371 Date: Feb. 25, 2000

§ 102(e) Date: Feb. 25, 2000

(87) PCT Pub. No.: WO00/00862

PCT Pub. Date: Jan. 6, 2000

(30) Foreign Application Priority Data

Jun. 26, 1998  (DE) ................................................ 198 28 548

(51) Int. Cl.[7] .................................................... G02B 21/00
(52) U.S. Cl. ........................... 359/381; 359/368; 359/380
(58) Field of Search .................................... 359/368–390, 359/422, 423, 431–432

(56) References Cited

U.S. PATENT DOCUMENTS

| | | | |
|---|---|---|---|
| 3,997,239 | * 12/1976 | Scherzer | 359/381 |
| 4,652,094 | * 3/1987 | Kitajima | 359/380 |
| 4,779,967 | * 10/1988 | Murphy et al. | 359/379 |
| 5,296,962 | * 3/1994 | Furuhashi | 359/381 |
| 5,519,531 | 5/1996 | Sato | 359/380 |
| 5,532,872 | 7/1996 | Sakamoto et al. | 359/384 |

FOREIGN PATENT DOCUMENTS

| | | |
|---|---|---|
| 341 59 58 A1 | 3/1985 | (DE) . |
| 34 02 354 | 7/1985 | (DE) . |
| 195 13 870 A1 | 10/1996 | (DE) . |
| WO 98/21616 | 5/1998 | (WO) . |

OTHER PUBLICATIONS

*English Abstract of DE 341 59 58 A1.
*English Abstract of DE 195 13 870 A1.

* cited by examiner

*Primary Examiner*—Thong Nguyen
(74) *Attorney, Agent, or Firm*—Reed Smith LLP

(57) ABSTRACT

A microscope with an exchangeable intermediate tube that is inserted between the microscope objective and an ocular eyepiece instead of the tube lens and which is adjustable in a defined manner with respect to its height and has relay or transfer optics with an essentially constant intersection length, comprising, in the observation direction, a first lens group with a long focal length, preferably greater than 10 m, and a second lens group with a short focal length whose common focal length corresponds to the focal length of a standard tube lens, preferably approximately 164 mm, wherein the distance between the first and second lens group is adjustable.

9 Claims, 4 Drawing Sheets

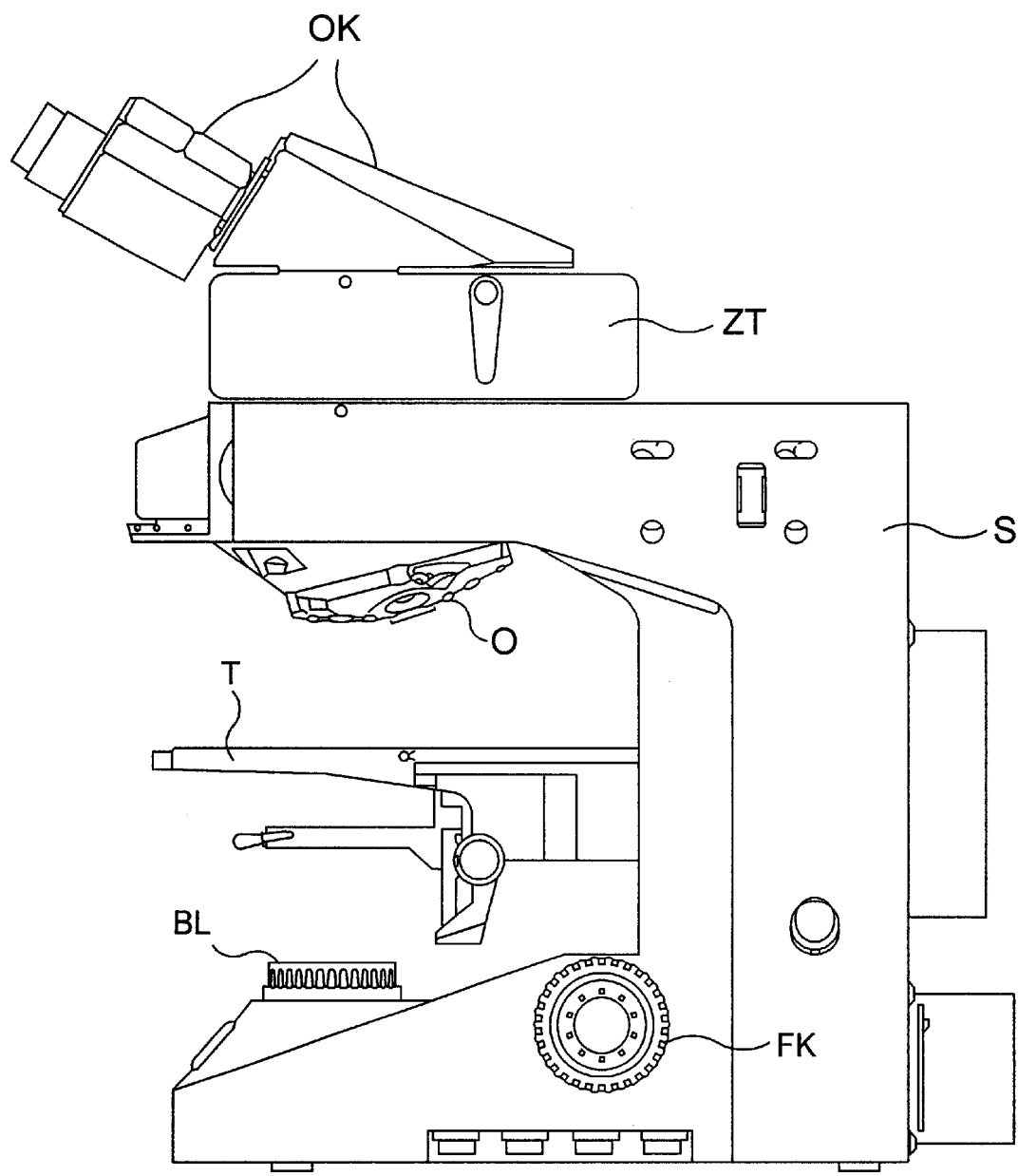
F I G. 1

MICROSCOPE COMPRISING AN EXCHANGEABLE INTERMEDIATE TUBE

BACKGROUND OF THE INVENTION (a) Field of the Invention

In many conventional microscopes, the height of the tube eyepiece is not ergonomically favorable for all persons. When using commercially available tubes with a binocular part which is adjustable with respect to angle, the viewing height changes only within a limited area, while the viewing angle can be optimally adjusted to the needs of the user. Viewing height and viewing angle are rigidly dependent on one another. In many cases, this leads to unsatisfactory conditions in ergonomic respects.

(b) Description of the Related Art

Many microscope manufacturers solve the problem of height adaptation by means of intermediate pieces of different heights, with and without compensating optics. The disadvantage herein consists in that only fixed values of the viewing height can be realized, and this is only possible by changing intermediate pieces of different heights.

OBJECT AND SUMMARY OF THE INVENTION

It is the primary object of the invention to improve ergonomic conditions for the microscope user.

This object is met in a microscope in accordance with the invention with an exchangeable intermediate tube that is inserted between the microscope objective and an ocular eyepiece instead of the tube lens and which is adjustable in a defined manner with respect to its height and has relay or transfer optics with an essentially constant intersection length.

BRIEF DESCRIPTION OF THE DRAWINGS

In the drawings:

FIG. 1 is a side, partially schematic view of a microscope in accordance with the invention;

in FIG. 5a, the lens groups are in an upper position and in FIG. 5b, they are in a lower position; in FIG. 5c, a conventional tube lens is shown which is replaced by the intermediate tube according to the invention.

DESCRIPTION OF THE PREFERRED EMBODIMENTS

The subject matter of the invention is an intermediate tube with continuous height adjustment which, without conversion, advantageously allows a height variation of up to 50 mm during use of the microscope.

In this range, the image quality and magnification in the intermediate image remain unchanged, so that the user finds, in every position, the same optical conditions as those existing when working without an intermediate tube and with only the binocular tube attached.

The intermediate tube is modular: it can be placed optionally between every tube and the microscope stand. However, it is preferably combined with a suitable ergonomic tube so as to be able to vary the height and angle independently from one another within certain limits. This accordingly does away with the compulsory coupling of swiveling and height adjustment.

The lower optics on the light entrance side are advantageously fixed and guide the parallel beam pencil or beam bundle onto the upper outlet optics which are movable in the direction of the microscope axis. This produces an intersection length of the tube lens which would normally, i.e., without the intermediate tube, be found in the tube inlet and maintains it constant in every variable position. The image correction is likewise maintained.

The intermediate tube is formed of two square halves, the lower half being rigidly adapted to the stand, while the upper half moves upward by the action of a coil spring when a clamping lever is released. A binocular tube without tube lens is adapted to the upper half. The construction is carried out in such a way that the vertical movement is carried out parallel to the optical axis with a very slight centering error of the optics.

The lower fixed optics are virtually zero power (f greater than 10 m) and only have a color-correcting effect. The displaceable optics have a constant focal length of about 164 mm, while the intersection length of 162 mm in the present example differs only in the hundredth range with a variation in height. But this has no noticeable influence on the image position.

FIG. 1 shows the schematic construction of a microscope with the intermediate tube according to the invention. It includes a stand S, illumination BL, focusing knob FK, exchangeable objectives O, specimen stage or table T, ocular tube OK and attachable intermediate tube ZT between the objective O and ocular tube OK.

Figure 2:
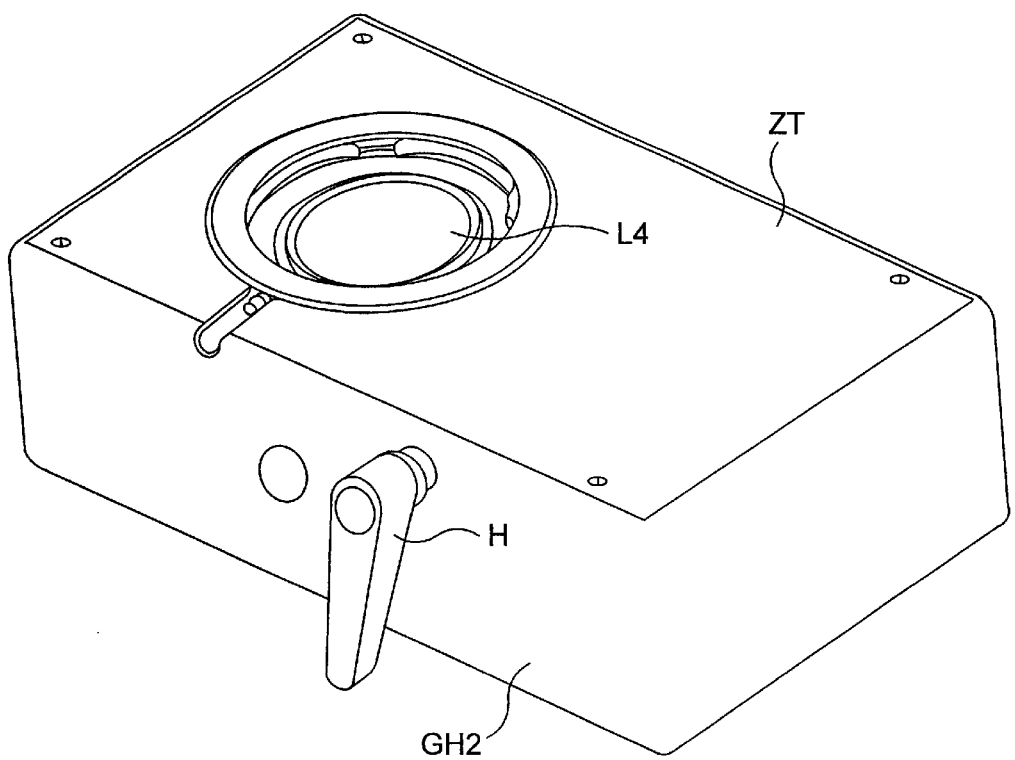
FIG. 2 is a perspective, three-dimensional view of the intermediate tube.

FIG. 2 shows the intermediate tube ZT in a three-dimensional view. It has a clamping lever H. The upper lens group L3, L4 is shown in FIG. 2.

Figure 3A:
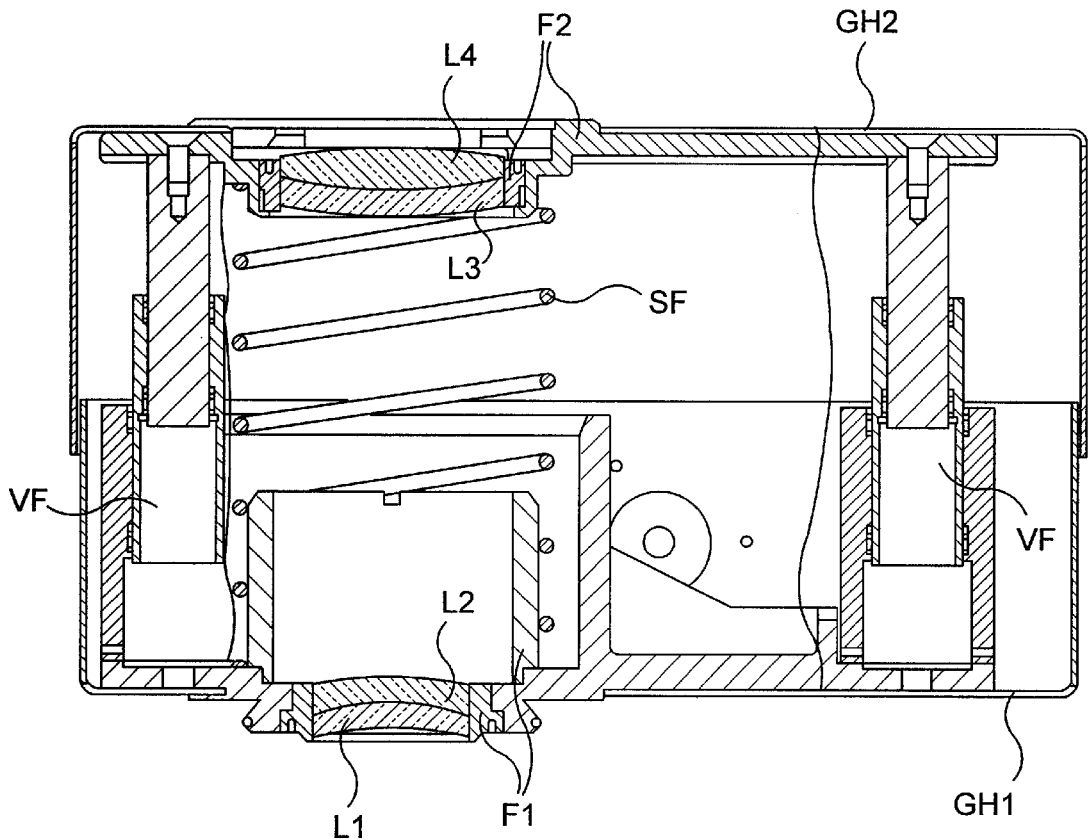
FIG. 3a is a schematic cross section through the intermediate tube an upper position.

FIGS. 3a, b show a schematic cross section through the intermediate tube ZT. It has a lower housing part GH1 with a barrel or mount F1 for a lens group L1, L2 and a coil spring SF which is guided around the mount F1 and which presses against an upper movable housing part which receives a lens group L3, L4 in a mount F2, wherein the coil spring SF is guided around the mount F2.

In order to prevent centering errors, a plurality of vertical guides VF are provided for the housing part GH2.

Figure 3B:
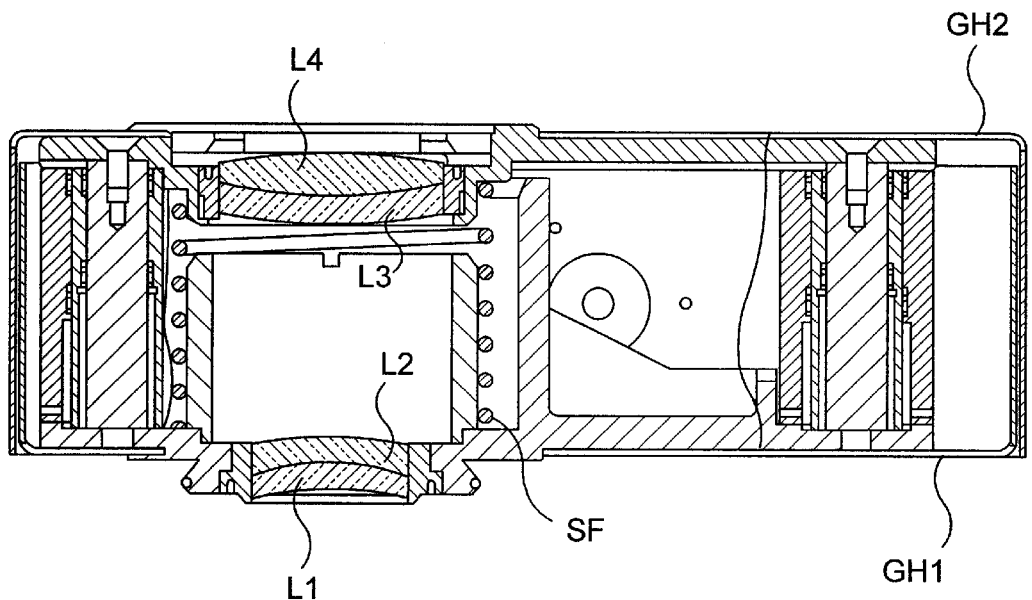
FIG. 3b is a schematic cross section through the intermediate tube in a lower position.

FIG. 3a shows the intermediate tube in an upper position and FIG. 3b shows the intermediate tube in a lower position.

Figure 4:
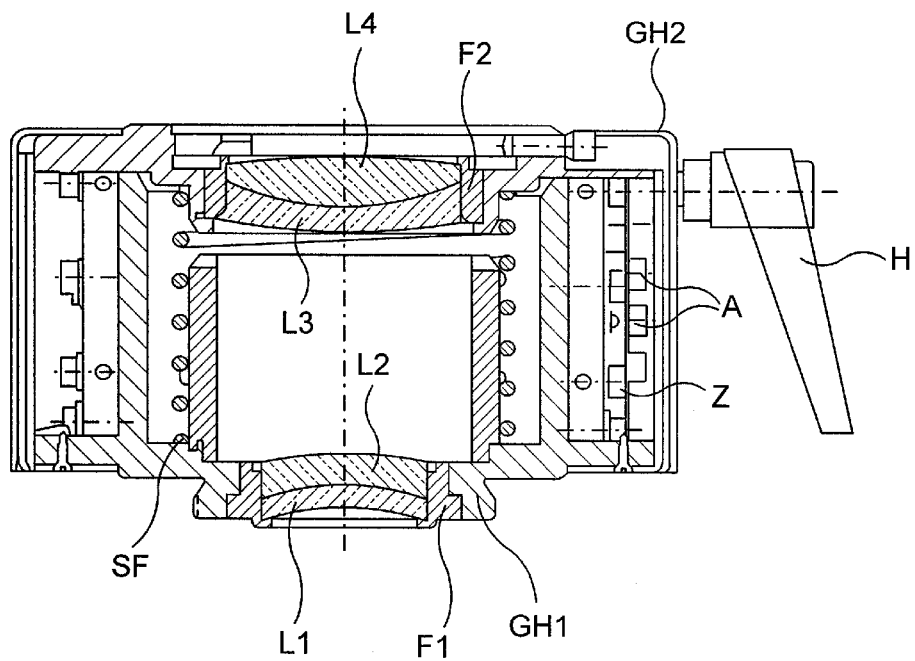
FIG. 4 is a schematic cross section through the intermediate tube showing additional elements in accordance with the invention.

FIG. 4 additionally shows that the clamping lever H is fastened to the upper housing part GH2 and recesses A are provided in GH2, wherein pins Z which are connected with the lower housing part GH1 engage in the recesses A in the locked position of the lever H.

When the locking lever H is released, the recesses A are lifted out of the pins Z and the upper part GH2 moves upward due to spring force or the observer presses down. In the desired ergonomically favorable position, locking is again effected via the lever H in that the recesses A engage in the pins Z corresponding to the adjusted position.

Figures 5A, 5B, 5C:
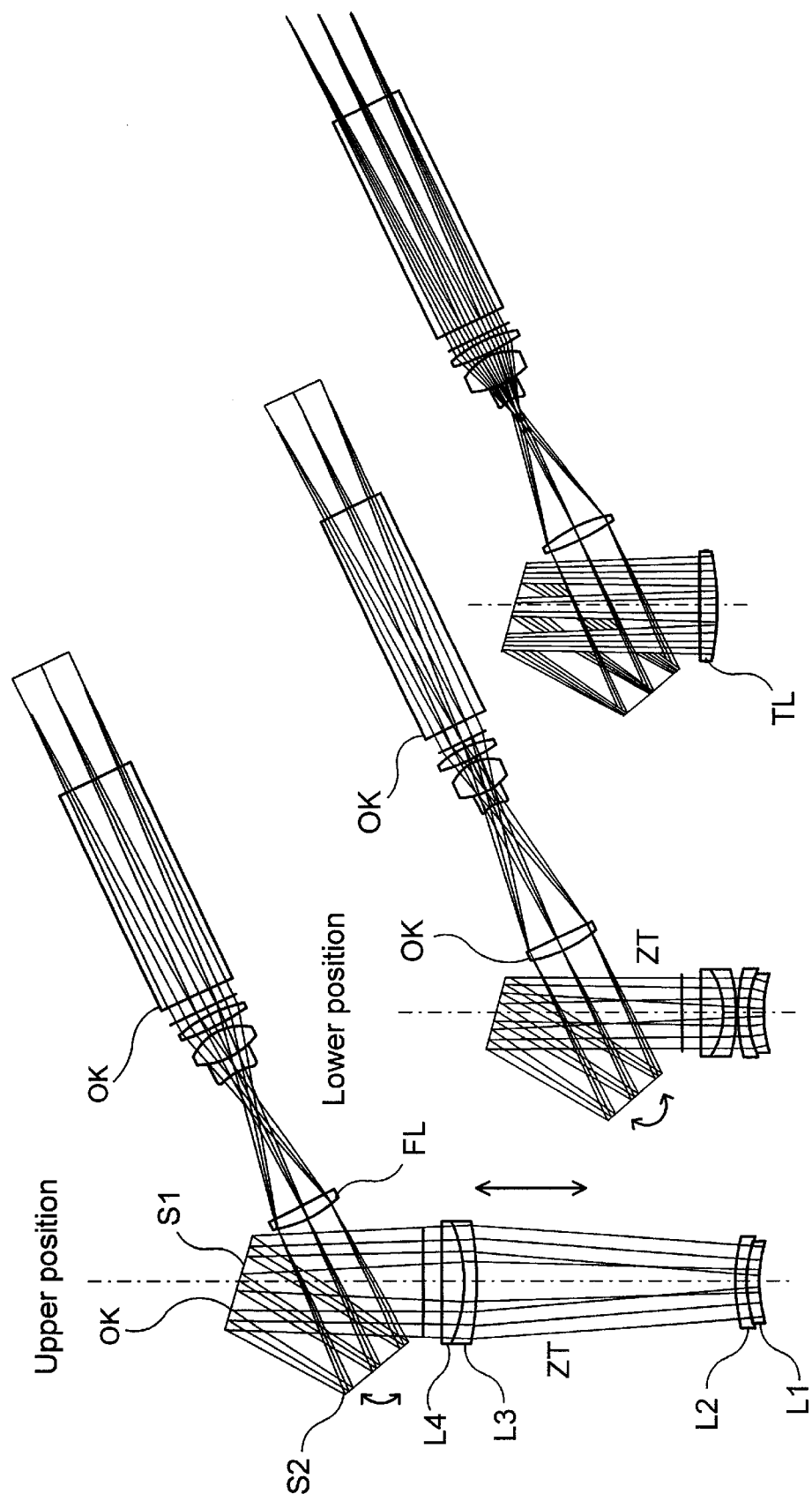
FIGS. 5a, 5b and 5c are drawings showing the optical beam paths and the lens groups L1, L2 and L3, L4.

FIGS. 5a to 5c show the optical beam paths and the lens groups L1, L2 and L3, L4, specifically, in an upper position in FIG. 5a and in a lower position in FIG. 5b.

A first intermediate image is generated in the adjoining binocular part OK, which is adjustable with respect to angle, between a first deflecting mirror S1 and a second mirror S2 which is constructed as a rotating mirror for swiveling the binocular part, and a field lens FL. This image can be used in straight pass-through directly as an image for a photo output (not shown here). The second intermediate image is located at the output of the binocular tube OK and is received in that location by the ocular, not shown.

It is clear that the intersection length which is generated almost exclusively by L3, L4 remains unchanged, so that nothing changes with respect to the optical imaging through the ocular eyepiece.

FIG. 5c shows a conventional tube lens TL which is advantageously replaced by the intermediate tube ZT according to the invention.

The optical data of the intermediate tube according to the invention are indicated in the following. Data are given in mm with a tolerance of ±10%:

| Lens | Focal Length | Material | Thickness | Radius of Curvature |
|------|--------------|----------|-----------|---------------------|
| L1   | 153.88       | SFL6     | 4.5       | F1 = 53.083         |
|      |              |          |           | F2 = 38.681         |
| L2   | −166.26      | F5       | 4.4       | F3 = F2             |
|      |              |          |           | F4 = 65.405         |
| L3   | −176.85      | F5       | 4.5       | F5 = 97.196         |
|      |              |          |           | F6 = 50.117         |
| L4   | 87.54        | FK5      | 8.5       | F7 = F6             |
|      |              |          |           | F8 = 277.76         |

Group focal length L1 + L2: 11122.87
Group focal length L3 + L4: 177.77
Distance L1, L2 from L3, L4: between 40 and 90 mm
Intersection length: 162.07 mm, focal length 164 mm While the foregoing description and drawings represent the preferred embodiments of the present invention, it will be obvious to those skilled in the art that various changes and modifications may be made therein without departing from the true spirit and scope of the present invention.

What is claimed is:

1. In a microscope, an arrangement comprising:
    a microscope objective;
    an ocular eyepiece; and
    an exchangeable intermediate tube that is inserted between said microscope objective and said ocular eyepiece instead of a lens tube; and
    said intermediate tube including adjustment means with respect to its height and said intermediate tube having relay or transfer optics with an essentially constant intersection length and said intermediate tube comprising:
        in an observation direction, a first lens group with a long focal length; and
        a second lens group with a short focal length whose common focal length corresponds to a focal length of a replaced tube lens; wherein a distance between said first and second lens groups is adjustable.

2. The intermediate tube according to claim 1, wherein a pressure spring is arranged between holders of the first and second lens groups and a locking of the holders is provided in a plurality of vertical positions.

3. A combination of an intermediate tube according to claim 1, with a swivelable ocular eyepiece in a microscope.

4. The intermediate tube of claim 1, wherein the focal length of the first lens group is greater than 10 m.

5. The intermediate tube of claim 1, wherein the common focal length is approximately 164 mm.

6. The intermediate tube of claim 1, with the following optical data of a first lens group L1, L2 and a second lens group L3, L4 with a tolerance of ±10%:
in mm

| Lens | Focal Length | Material | Thickness | Radius of Curvature |
|------|--------------|----------|-----------|---------------------|
| L1   | 153.88       | SFL6     | 4.5       | F1 = 53.083         |
|      |              |          |           | F2 = 38.681         |
| L2   | −166.26      | F5       | 4.4       | F3 = F2             |
|      |              |          |           | F4 = 65.405         |
| L3   | −176.85      | F5       | 4.5       | F5 = 97.196         |
|      |              |          |           | F6 = 50.117         |
| L4   | 87.54        | FK5      | 8.5       | F7 = F6             |
|      |              |          |           | F8 = 277.76         |

Group focal length L1+L2: 11122.87
Group focal length L3+L4: 177.77
Distance L1, L2 from L3, L4: between 40 and 90 mm
Intersection length: 162.07 mm.

7. In a microscope, an arrangement comprising:
    a microscope objective;
    an ocular eyepiece; and
    an exchangeable intermediate tube that is inserted between said microscope objective and an ocular eyepiece instead of a lens tube; and said intermediate tube including adjustment means with respect to its height and said intermediate tube having relay or transfer optics with an essentially constant intersection length;
    said intermediate tube further comprising in the observation direction, a first lens group with a long focal length greater than 10 m and a second lens group with a short focal length whose common focal length corresponds to a focal length of a replaced tube lens of approximately 164 mm, wherein a distance between the first and second lens groups is adjustable.

8. In a microscope, an arrangement comprising:
    a microscope objective;
    an ocular eyepiece; and
    an exchangeable intermediate tube that is inserted between said microscope objective and said ocular eyepiece instead of a lens tube; and
said intermediate tube being adjustable in a defined manner with respect to its height and having relay or transfer optics with an essentially constant intersection length, with the following optics data of a first lens group L1, L2 and a second lens group L3, L4 with a tolerance of ±10%:
in mm

| Lens | Focal Length | Material | Thickness | Radius of Curvature |
|------|--------------|----------|-----------|---------------------|
| L1   | 153.88       | SFL6     | 4.5       | F1 = 53.083         |
|      |              |          |           | F2 = 38.681         |
| L2   | −166.26      | F5       | 4.4       | F3 = F2             |
|      |              |          |           | F4 = 65.405         |
| L3   | −176.85      | F5       | 4.5       | F5 = 97.196         |
|      |              |          |           | F6 = 50.117         |
| L4   | 87.54        | FK5      | 8.5       | F7 = F6             |
|      |              |          |           | F8 = 277.76         |

Group focal length L1+L2: 11122.87
Group focal length L3+L4: 177.77
Distance L1, L2 from L3, L4: between 40 and 90 mm
Intersection length: 162.07 mm.

9. An intermediate tube for a microscope comprising:

in the observation direction, a first lens group with a long focal length and a second lens group with a short focal length whose common focal length corresponds to a focal length of a standard tube lens; wherein a distance between said first and second lens groups is adjustable;

the intermediate tube having the following optical data of the first lens group L1, L2 and the second lens group L3, L4 with a tolerance of ±10%:

in mm

| Lens | Focal Length | Material | Thickness | Radius of Curvature |
| --- | --- | --- | --- | --- |
| L1 | 153.88 | SFL6 | 4.5 | F1 = 53.083 |
|  |  |  |  | F2 = 38.681 |
| L2 | −166.26 | F5 | 4.4 | F3 = F2 |
|  |  |  |  | F4 = 65.405 |
| L3 | −176.85 | F5 | 4.5 | F5 = 97.196 |
|  |  |  |  | F6 = 50.117 |
| L4 | 87.54 | FK5 | 8.5 | F7 = F6 |
|  |  |  |  | F8 = 277.76 |

Group focal length L1+L2: 11122.87

Group focal length L3+L4: 177.77

Distance L1, L2 from L3, L4: between 40 and 90 mm

Intersection length: 162.07 mm.

* * * * *